US006526143B1

(12) United States Patent
Wagner et al.

(10) Patent No.: US 6,526,143 B1
(45) Date of Patent: Feb. 25, 2003

(54) DEVICE FOR LIFTING A HANDSET (75) Inventors: Morten Bjørn Wagner, Virum (DK); René Sørensen, Brønshøj (DK)

(73) Assignee: GN Netcom A/S (DK)

( * ) Notice: Subject to any disclaimer, the term of this patent is extended or adjusted under 35 U.S.C. 154(b) by 145 days.

(21) Appl. No.: 09/659,154

(22) Filed: Sep. 11, 2000

Related U.S. Application Data (63) Continuation of application No. PCT/DK99/00127, filed on Mar. 12, 1999.

(30) Foreign Application Priority Data

Mar. 12, 1998 (DK) ................................................ 0337/98

(51) Int. Cl.$^7$ ................................................ H04M 1/00
(52) U.S. Cl. ..................................... 379/447; 379/448
(58) Field of Search ................................. 379/447, 448, 379/454, 446, 455; 455/90

(56) References Cited

U.S. PATENT DOCUMENTS

D358,594 S    5/1995   Clour
5,732,355 A  * 3/1998  Lipp et al. .................. 379/448
5,930,354 A    7/1999  Britto et al.

FOREIGN PATENT DOCUMENTS

EP         0 680 188        11/1995

OTHER PUBLICATIONS

FR 1,336,109, M. Camille Lartigau, *Brevet D'Invention*, Jul. 22, 1963.

* cited by examiner

*Primary Examiner*—Jack Chiang
(74) *Attorney, Agent, or Firm*—Altera Law Group LLC (57) ABSTRACT

The present invention concerns a lifting device which is configured to be coupled mechanically to a given telephone apparatus, said telephone apparatus having a handset and a fixed part, and whereby the lifting of the handset activates a switch in the telephone apparatus. The lifting device comprises a movable element which is configured to be in connection with the handset and lift the handset by means of a drive unit which brings about a movement of the movable element. The lifting device also comprises a bracket which is configured to be placed on the telephone apparatus in between this and the handset, under which the movable element is housed in a movable manner in the bracket.

9 Claims, 6 Drawing Sheets

DEVICE FOR LIFTING A HANDSET

This application is a continuation of PCT/DK9900127 filed Mar. 12, 1999.

BACKGROUND OF THE INVENTION

The present invention relates to a device for the automatic lifting of a handset on conventional telephone apparatus.

Today, so-called headsets are most often used in connection with conventional telephone apparatus, whereby the user can speak into the telephone without having to use his/her hands to hold the handset.

In the years to come, on the headset market it is quite certain that an increasing use will be seen of wire-less headsets, e.g. based on the DECT standard which gives the user extensive freedom of movement within a smaller local area.

Such wire-less headsets will in many cases be configured to be able to be coupled to a given traditional telephone apparatus via a stationary base station, whereby the headset and the base station are inserted between the handset and the telephone apparatus.

The telephone apparatus hereby serves to enable the user to carry out the necessary calling procedure over the keypad of the telephone apparatus, and by means of a changeover switch the user has the possibility of being able to use the "original" handset or headset of the telephone apparatus.

Presumably, the wire-less headset will in many cases be used in the immediate vicinity of the telephone apparatus, i.e. within operational reach.

The operation of the headset takes place by lifting the handset from the telephone apparatus, either in order to answer a call or to make a call from the telephone.

In this connection it can be impractical to have to lift the handset from the telephone apparatus and possibly place it somewhere else for as long as the telephone call lasts.

A known lifting device which solves the above-mentioned problem is "Cradle Mate", U.S. Pat. No. Des. 358 594. This involves a purely mechanical arrangement which lifts the handset from the telephone at that end which activates the line establishing switch of the telephone, while the other end of the handset rests on the telephone. The device comprises a plate part which is fastened on the side of the telephone apparatus, said plate part housing a lifting part which can be rotated by a knob or handle, whereby the handset can be lifted mechanically from the switch.

In many cases, however, the headsets of the wire-less type will not be used in the immediate vicinity of the telephone, and thus the user does not have the possibility of answering an incoming call without first having to move to the apparatus.

It will become immediately obvious that the base station could be configured in such a manner that calls could be detected electrically over the telephone line and control the telephone.

Unfortunately, at present there are a great many different national standards for telephone connections, connectors and ringing signals. Therefore, for a given telephone apparatus it is technically difficult to effect an electrical detection of whether a call is made to the apparatus. However, there is one clear indication of the extent to which a call is made to a given telephone apparatus, and this is in the form of an acoustic ringing tone emitted from the telephone apparatus.

Figure 1:
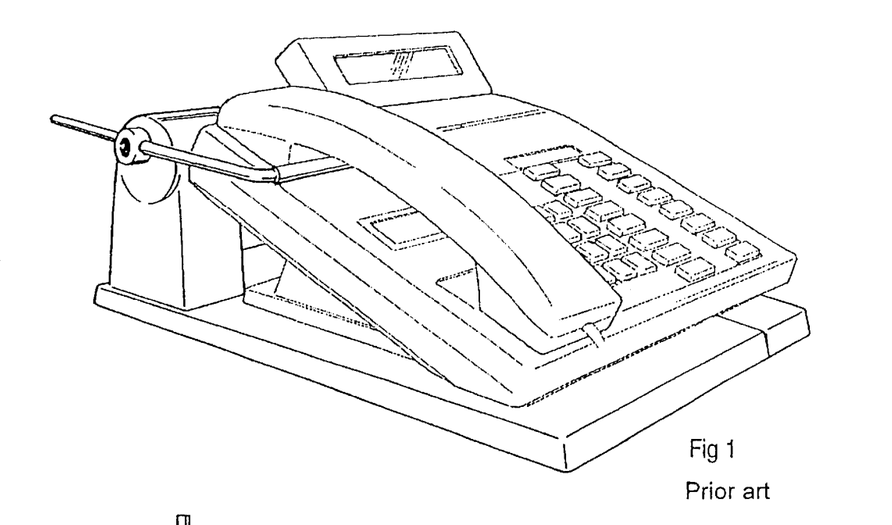
FIG. 1 is a side view of a known lifting device coupled to a telephone apparatus.
Figure 2:
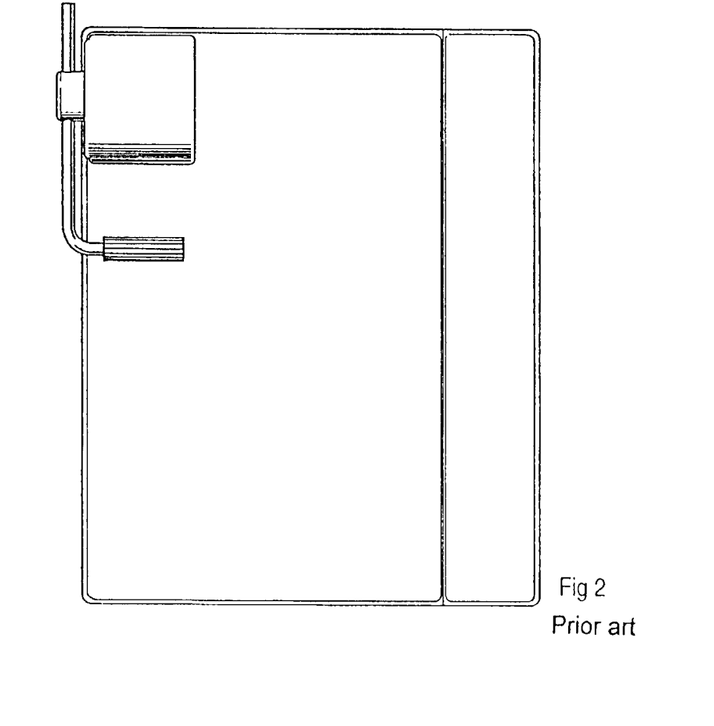
FIG. 2 is a further illustration of the known lifting device according to FIG. 1.

Precisely this condition is used by a known lifting device, which is illustrated in FIGS. 1 and 2. The device is produced by "Hello Direct Inc.", San Jose, Calif. 95138, and is sold under the name "Readiline".

The above-mentioned handset lifting apparatus, which is also called a "hook switch", automatically lifts the handset from the telephone and thus activates the built-in switch of the telephone for establishing the line.

The apparatus, which is intended to be connected to a base station for a wire-less headset, detects the acoustic ringing tone from the telephone, upon which the apparatus transmits a signal to the wire-less headset to indicate that there is an incoming call.

If the person wearing the headset wants to answer the call, he/she must activate a button on the headset, whereby a signal is sent back to the base station which, upon receipt of this signal, results in the handset being lifted by the lifting device. The telephone connection is hereby established without the wearer of the headset having to be in the vicinity of the telephone apparatus itself.

The apparatus described above comprises a base-plate on which the telephone is placed, and an activator part which extends upwards in relation to the base-plate, and with which the side of the telephone is placed in abutment. The activator part houses an electric motor, control and signal electronics and a microphone. On the activator part there is a swivel-mounted, movable arm which engages with the underside of the handset, and which when activated turns upwards and herewith lifts the handset.

The apparatus described above suffers the disadvantage that it occupies a relatively large amount of space and is not as flexible as could be desired, in that certain telephone apparatus on the present market are unable to function in connection with this apparatus.

An apparatus for the lifting of the handset from a telephone is also known from European publication EP A 680 188. The publication relates to the use of mobile telephones, i.e. telephones of the kind which have a fixed part and a portable part which can be in radio contact with each other within smaller distances, in connection with conventional telephone apparatus which are coupled to a normal network and especially a local net. The technique which is disclosed in this publication makes it possible to use analogue portable telephones in connection with conventional telephones, e.g. telephones which are coupled to a digital local network.

For this purpose, the publication describes a lifting device of the kind as disclosed in the preamble to claim 1, and which can lift the handset from the conventional telephone when calls are made or when incoming calls are received, e.g. controlled by a changeover switch on the portable telephone or a microphone which is built into the conventional telephone.

In one embodiment (shown by way of example in FIGS. 6 and 7), this lifting device is mounted on the side of the conventional telephone, in that e.g. it is mounted by velcro tape. In this embodiment, the lifting device consists of a housing containing, among other things, a drive unit and an activator part which can be moved into and out of the housing by the drive unit. The activator part is bar-shaped, and at its outer end it has a bend which can engage in under the handset so that this is lifted by the outwards-directed movement of the activator part. With this embodiment, the lifting device must be adapted to the shape of the individual telephone apparatus, in that among other things the activator part must be configured depending of the shape of the handset and its distance from the side of the telephone apparatus. Consequently, this known lifting device does not lend itself to universal application. Moreover, with certain telephone apparatus configurations it can be difficult or even impossible to find a side surface which is suitable for the mounting of the lifting device, in that such a side surface must have a suitable angle in relation to the vertical plane and/or in relation to the handset and be suitably disposed in relation to the position of the handset.

In a second embodiment (shown by way of example in FIGS. 13 and 14 of the publication), the lifting device is configured as a relatively flat, box-shaped part which is placed between the handset and the fixed part of the conventional telephone at the place where the changeover switch of the conventional telephone is located, and where in the idle state the built-in switch is pressed down by a part of the handset. In this embodiment, the lifting device has an activation bar which extends between the activation button for the built-in switch and the handset, so that when an incoming call is received the handset is lifted at the same time that the activation button is free to move upwards, hereby establishing the connection. Like the embodiment described above, this embodiment suffers the disadvantage that it must be adapted to suit the type of telephone apparatus it is used in connection with, in that there must be a close relationship between the positioning and the configuration of the activation button of the telephone apparatus, the positioning of the handset on the telephone apparatus and the configuration of the lifting device. In certain cases it can be difficult or even impossible to find a suitable position for the lifting device, for example when the activation part of the built-in switch comprises a flap or the like which covers the whole of the area on which the relevant part of the handset rests. Moreover, the lifting device has to be relatively flat in order for it to be used in practice, which imposes additional upper limits on the physical dimensions of the drive unit and other components which are built into the box-shaped part.

It is a first object of the present invention to provide a lifting device with small dimensions and great flexibility.

An additional object is to provide a lifting device of the kind disclosed in the preamble to claim 1, which can be used in connection with a wide spectrum of telephone apparatus of different configurations.

This is achieved by configuring the lifting device disclosed in the preamble to claim 1 as described in the characterizing portion of claim 1.

By far the most types or models of telephone apparatus have a space between the handset, when this is in its rest position, and the remaining part of the telephone apparatus, i.e. its fixed part, in which at least a part of the bracket for the lifting device according to the invention can be placed. It will thus be possible to place the lifting device according to the invention on such a telephone apparatus, in that there will be wide scope for the positioning of the lifting device as such, merely providing that the demand that at least a part of the bracket can be placed under the handset is fulfilled. Since it is only on a part of the bracket in which the movable element is housed which must be placed under the handset, there arises no particular demands concerning the miniaturising of the components which form part of the drive unit as such, in that these components can be placed outside the relevant part of the bracket. Consequently, the components can be configured without any great difficulties with dimensions which provide the necessary characteristics regarding strength, functionality and resistance to wear.

Further advantageous example embodiments are disclosed in the dependent claims, and the advantages hereof will emerge more clearly in the following description.

THE DRAWING

The invention will now be explained in more detail with reference to the drawing, where FIG. 5 is a view of the lifting device shown in FIG. 3, seen from above, FIG. 5a shows a leaf spring with a spacing block seen from above, FIGS. 5b–c show two alternative embodimens of FIG. 5a, FIG. 6 is a view of the lifting device shown in FIGS. 3–5, seen at an angle from the side.

DESCRIPTION OF PREFERRED EXAMPLE EMBODIMENTS

The invention will now be explained in more detail with reference to the drawing.

FIGS. 3–6 and 9 show a preferred embodiment of the lifting device according to the invention.

Seen from the outside, the lifting device 1 comprises two main elements, i.e. a bracket 2 which is configured to be mounted on the fixed part of a given telephone immediately under the handset, so that the bracket lies between the telephone apparatus and the handset, and a housing 3 which is pivotally mounted in relation to the bracket 2.

The housing 3 contains a drive unit 10, a microphone, a socket 23 by which the lifting device 1 is supplied with electrical energy and/or is connected to a base station for a headset and to electronics for detection of the acoustic signal which is emitted by the coupled telephone apparatus, and which is detected by said microphone.

Downwards, the bracket 2 has a surface 21 which with advantage can be self-adhesive for fastening to the fixed part of the relevant telephone with which the lifting device is to function. Upwards, the bracket 2 has a movable element 16 or 17 which is movably connected to the bracket 2 and which is driven by the drive unit 10, which is in placed in the housing 3 by a mechanical coupling which consists of various drive mechanisms, including the gear wheel 9.

Figure 9:
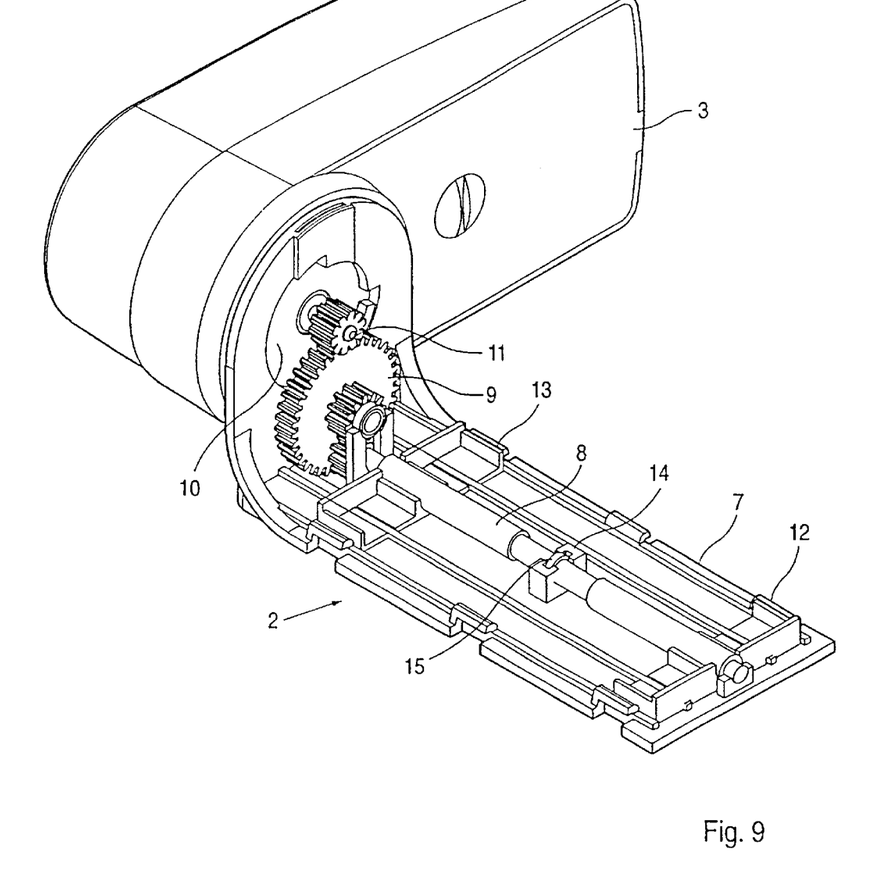
FIG. 9 is a view of the inside of the lifting device for the example embodiment corresponding to the FIGS. 3–6 and 8.

It is advantageous for the drive unit 10 to consist of an electric motor, as shown in FIG. 9, the driving spindle 11 of which lies on the axis of rotation around which the bracket 2 is pivotally mounted in relation to the housing 3.

It is advantageous that the bracket 2 has an upright part 5 which extends at an angle away from the lower surface 21 of the bracket, and on which the bearing block 4 for the housing 3 is placed. The bearing block 4 for the housing will thus typically lie at a certain distance from the surface of the fixed part of the coupled telephone.

Since the housing 3 is with advantage pivotally mounted on the bracket 2, the housing can assume a number of different positions, which means that the lifting device can be fitted on a large number of different telephone apparatus.

If space permits it for the given telephone, the pivotal housing enables the user to turn the housing 3 in the direction which is found to be most expedient, possibly to a position in which the housing is least visible, or to a position in which the housing 3 is flush with the lines of the telephone. It is with advantage that the bracket 2 is very limited in height, which makes it possible to place the bracket on most telephone apparatus, which are configured in such a manner that, in the idle position, the handset is placed at such a distance from the fixed part of the apparatus that users are just able to get their fingers in under the handset and to grip around it.

The invention provides the user with the further possibility of adapting the lifting device to telephone apparatus which have a greater distance between the handset and the fixed part.

Figure 6:
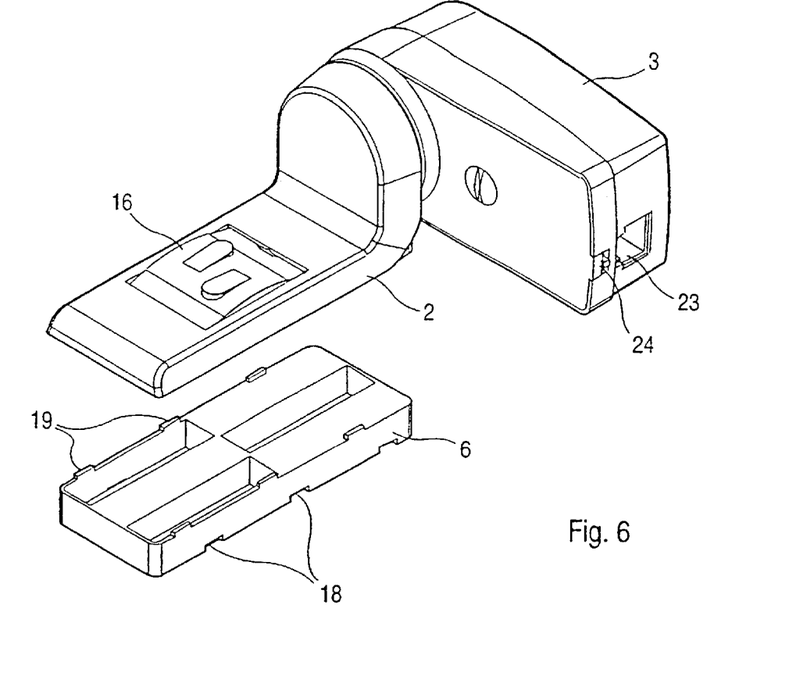
Figure 7:
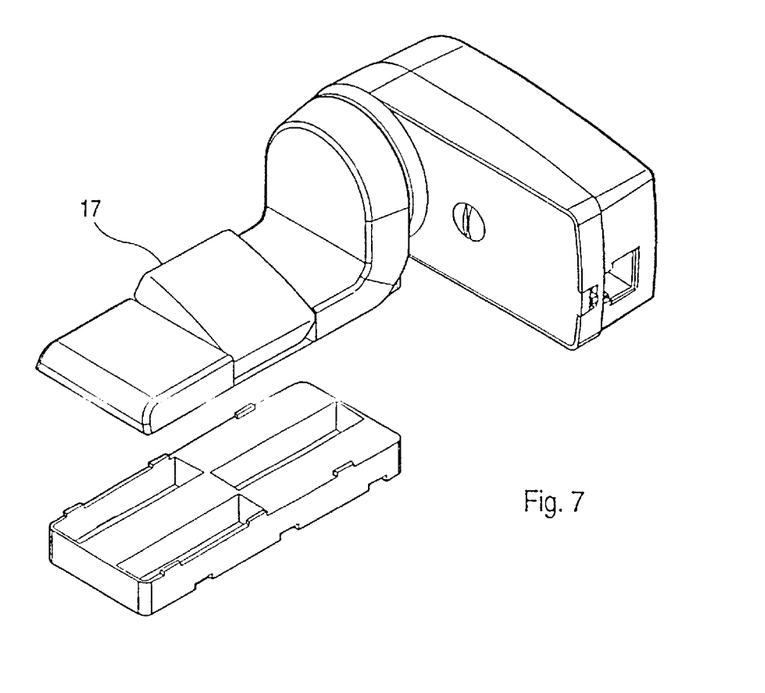
FIG. 7 is a view corresponding to that in FIG. 6, but of a second example embodiment of the invention.

With the example embodiment shown in FIGS. 6 and 7, one or more spacing blocks can be mounted immediately on the underside 21 of the bracket, and thus increase the distance. Such a spacing block 6 can possibly be provided with a special configuration to suit a particular type of telephone. It is thus possible at very little cost to produce a range of spacing blocks which are suitable for the most current types of telephones.

Figure 4:
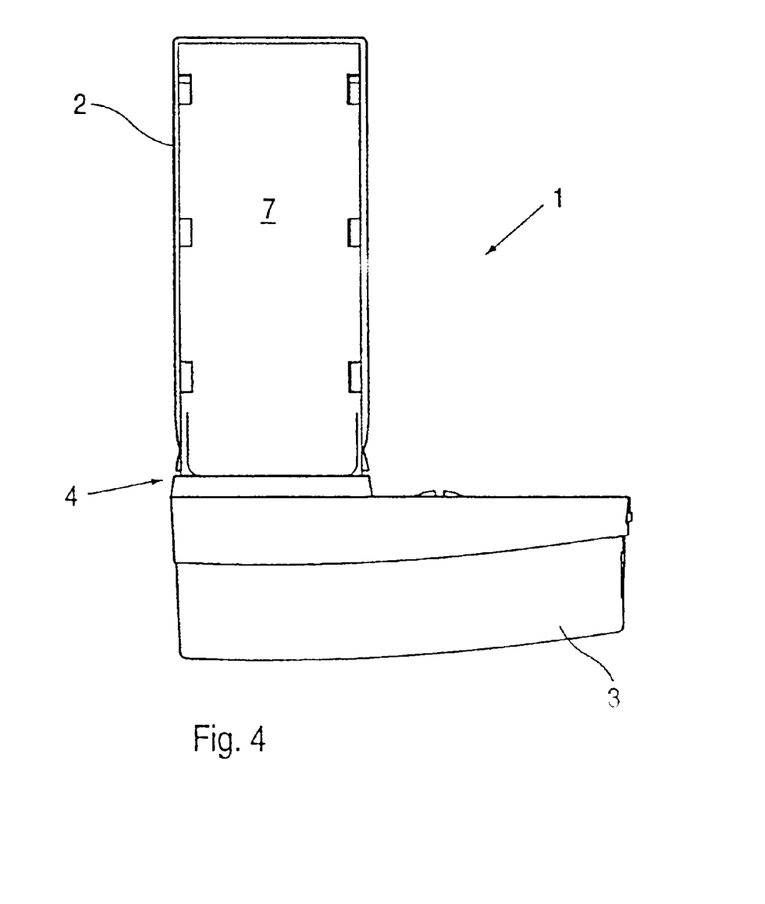
FIG. 4 is a view of the lifting device shown in FIG. 3, seen from below.

It is with advantage that the bracket has an bottom part 7 which forms the underside 21, and which downwards has a number of openings 18, see FIG. 4. Conversely, on its upwardly-facing surface, the spacing block 6 has a number of projections 19 with which the spacing block can be coupled to the openings 18 in the underside 21 of the bracket.

In the example embodiment shown in FIGS. 3–6 and 8, the movable element comprises a leaf spring 16,22.

The leaf spring 16 is configured to be influenced at its outer ends by the mechanism shown in FIG. 9, and in such a way that the leaf spring bends out at the middle and away from the bracket, whereby the handset can be lifted.

As shown in FIG. 9, the bottom part 7 of the bracket forms a holder for a spindle 8 which has two diametrically disposed, oppositely-rotating worm drives which are configured to engage with two end pieces 12, 13.

The spindle 8 is housed in a rotary manner in the bracket 2, and is advantageously held in its longitudinal axis by a flange 15 which is housed in the bearing 14 in the bottom part 7.

The end pieces 12, 13 are configured to be inserted in the bottom part 7 in the direction of the axis of the spindle, whereby the end pieces move away from or closer to each other, respectively, depending on the direction in which the spindle is rotated. The end pieces 12, 13 form a retainer for the leaf spring 16, whereby the above-mentioned bending outwards is achieved.

The drive unit 10, which lies in the housing 3, stands in connection with the spindle 8 via transmission elements or gear wheel 9, which provide the drive unit with suitable gearing, while at the same time the function of turning the housing 3 in relation to the bracket 2 is maintained.

Figure 3:
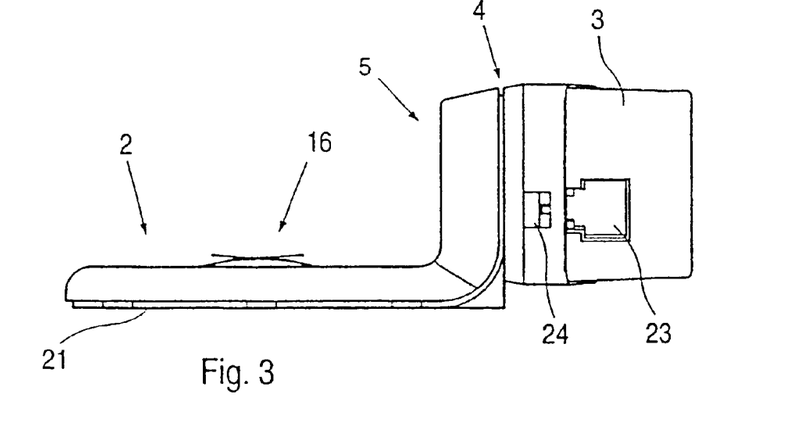
FIG. 3 is a side view of a first example embodiment of the lifting device according to the invention.
Figures 5, 5A, 5B, 5C:
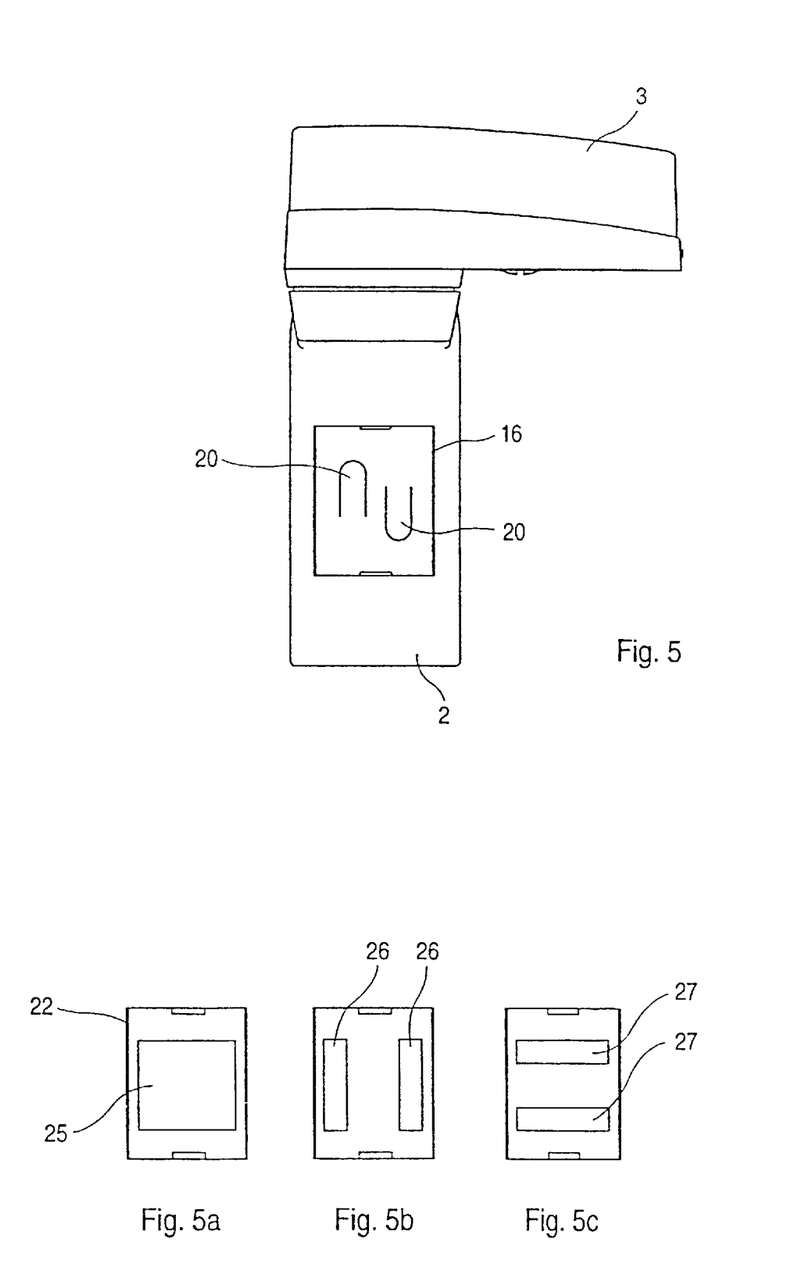

For a first embodiment of the leaf spring 16 shown in FIGS. 3, 5 and 6, the middle of the spring is advantageously provided with two cut-outs which form two opposing projections 20, and which herewith provide a contact surface against the handset for the coupled telephone. The leaf spring can with advantage be made of spring steel or plastic.

Moreover, the leaf spring 16 can easily be removed from the bracket 2, without this having to be separated, and it can possibly be replaced by a leaf spring of another length or shape. The working height of the lifting device can herewith be varied as an alternative to or complementary to the use of the spacing blocks described above.

With the example embodiments shown in FIGS. 5a, 5b and 5c, there are shown different alternative configurations of the leaf springs 22 which can easily be inserted in the bracket 2, whereby the given lifting device can easily be adapted to the distance which arises between the handset and the fixed part of the telephone apparatus.

At their upper surfaces, the leaf springs 22 according to FIGS. 5a, 5b and 5c have different spacing blocks 25, 26 and 27 consisting of a flexible material, e.g. neoprene, which forms a surface with high friction against the handset and which in other respects does not prevent the outwards bending of the leaf springs. The spacing blocks 25–27 are with advantage mounted on the upper surfaces of the leaf springs by gluing, and like the above-mentioned spacing block 6 can with advantage be made available in a range having various heights.

With the example embodiment shown in FIG. 7, the movable element comprises an arm 17 which rocks around an axle (not shown) lying along the longitudinal axis of the bracket, and whereby a transmission element (not shown) imparts a turning movement to the arm.

Figure 8:
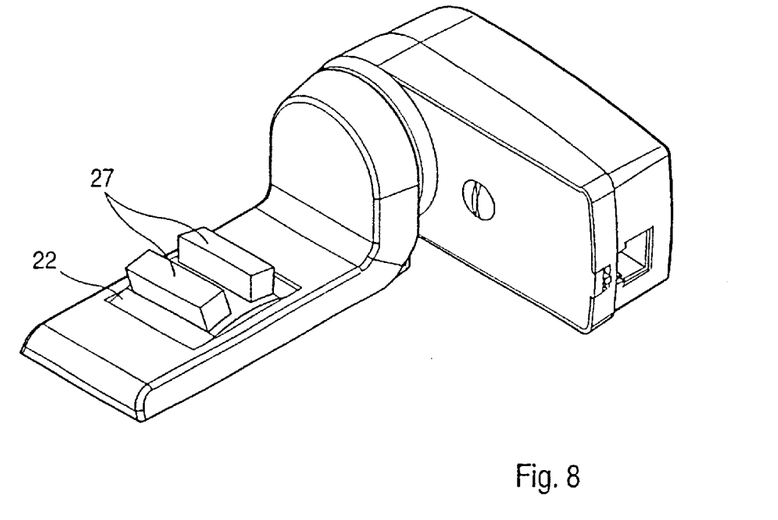
FIG. 8 is a view of the lifting device shown in FIG. 6, mounted with the leaf spring shown in FIG. 5c.

This example embodiment could be realised, for example, by an arrangement corresponding to the mechanism shown in FIG. 8, but where the spindle is simply modified to lie in the one side of the bracket, and where the arm 17 is firmly mounted on this spindle.

An alternative means of bringing about the lifting movement for the movable element could be a pneumatic arrangement, where the drive unit 10 still lies in the housing 3, and where a pneumatic actuator (not shown) lies in the bracket 2, whereby the pneumatic actuator either drives the movable element or simply constitutes this element.

With the example embodiment shown in FIG. 9, the lifting movement of the movable element 16 is controlled by a timer which controls the time which is required for the lifting and lowering respectively of the handset. The timing control will typically be set in such a way that it is taken into consideration that a lifting of the handset takes more time than the lowering of the handset. Possibly, a switch or an indicator (not shown) can be provided in the bracket which indicates a reference position for one of the end pieces.

The timing control is configured in such a way that this can be adjusted externally by means of a setting button 24, by which the possibility is provided in a series of steps of determining the distance for the lifting of the handset, and herewith adjust the lifting device to the relevant telephone apparatus.

What is claimed is:

1. A lifting device configured for mechanical coupling to a telephone apparatus having a handset and a fixed part, the lifting device comprising:

a bracket configured to affix the lifting device on the fixed part of the telephone apparatus in a position immediately under the handset, at least a part of the bracket being disposed between the fixed part of the telephone apparatus and the handset;

a movable element configured to stand in connection with the handset and to lift the handset via a drive unit connected to the movable element, the movable element being housed in a portion of the bracket, the portion of the bracket housing the movable element being disposed under the handset; and a housing pivotally mounted on the bracket containing electronics and the drive unit, wherein lifting the handset activates a switch in the telephone apparatus.

2. The lifting device according to claim 1, wherein the bracket has an adhesive underside which serves to secure the bracket on the fixed part of the telephone apparatus.

3. The lifting device according to claim 2, wherein the underside of the bracket may be configured with at least one spacing block, said spacing block having an adhesive underside.

4. The lifting device according to claim 1, wherein the housing containing electronics and a drive unit is pivotally mounted on the bracket via a bearing block, and wherein the drive unit may be an electric motor.

5. The lifting device according to claim 4, wherein the bracket has an upright part which extends at an angle away from the under surface of the bracket, on which upright part the bearing block for the housing is placed.

6. The lifting device according to claim 4, wherein the bracket comprises:

a spindle which is housed in a rotating manner in the bracket; and a gear wheel, wherein the spindle is driven by the drive unit via the gear wheel.

7. The lifting device according to claim 6, wherein the movable element consists of a leaf spring, and that the spindle has two diametrically-disposed, oppositely-rotating worm drives which are configured to engage with two end pieces, said end pieces being configured for displacement without rotation in an axial direction of the spindle and serving as a holder for the movable element.

8. The lifting device according to claim 6, wherein the movable element consists of an arm which is pivotally housed in the bracket, said arm being configured to be lifted by rotation of the spindle.

9. The lifting device according to claim 7, wherein the leaf spring has at least one spacing block which is made of a flexible material.

* * * * *